(No Model.)  2 Sheets—Sheet 1.

J. W. HANSEN.
ELECTRIC MOTOR.

No. 490,280.  Patented Jan. 24, 1893.

Witnesses
M. Fowler
L. P. Hothaupt

Inventor
Julius W. Hansen
By his Attorneys,
C. A. Snow & Co.

THE NORRIS PETERS CO., PHOTO-LITHO., WASHINGTON, D. C.

(No Model.)

2 Sheets—Sheet 2.

J. W. HANSEN.
ELECTRIC MOTOR.

No. 490,280.

Patented Jan. 24, 1893.

Witnesses

Inventor
Julius W Hansen
By his Attorneys,

UNITED STATES PATENT OFFICE.

JULIUS W. HANSEN, OF ST. PAUL, MINNESOTA, ASSIGNOR OF ONE-HALF TO WILLIAM H. EIMERS, OF SAME PLACE.

ELECTRIC MOTOR.

SPECIFICATION forming part of Letters Patent No. 490,280, dated January 24, 1893.

Application filed September 25, 1891. Serial No. 406,776. (No model.)

*To all whom it may concern:*

Be it known that I, JULIUS W. HANSEN, a citizen of the United States, residing at St. Paul, in the county of Ramsey and State of Minnesota, have invented a new and useful Electric Motor, of which the following is a specification.

This invention relates to electric motors; and it has for its object to provide a motor which may be used for the propulsion of vehicles or for the operation of any suitable machinery that may be desired, being constructed in a manner whereby a full utilization of the electric current is adapted to cause the rapid and steady revolution of the revolving armature; and with these and the other objects in view for which motors of this character are constructed the invention resides in the novel construction hereinafter described, illustrated in the accompanying drawings and specifically pointed out in the appended claims.

Figure 1:
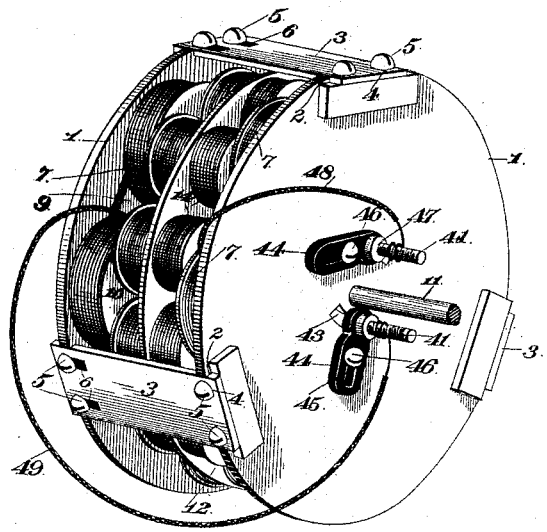
Figure 2:
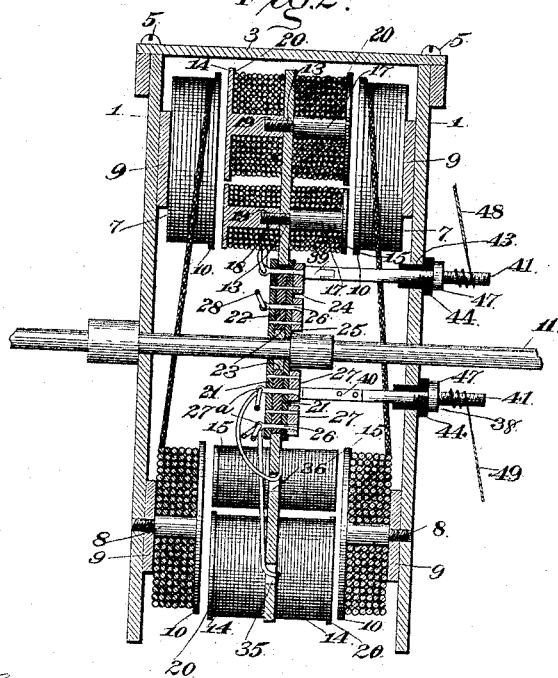
Figure 3:
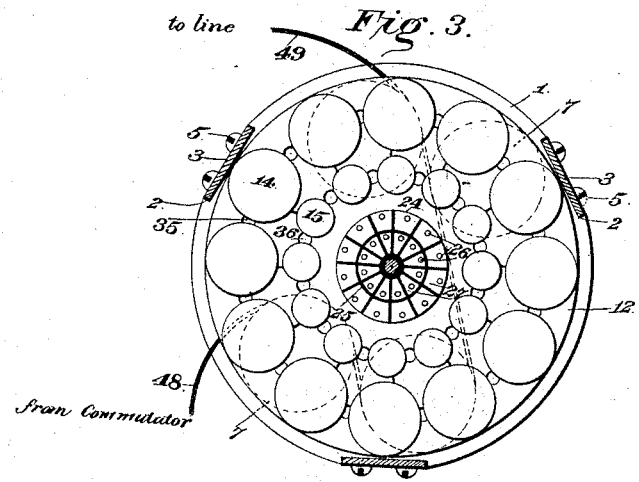
Figure 4:
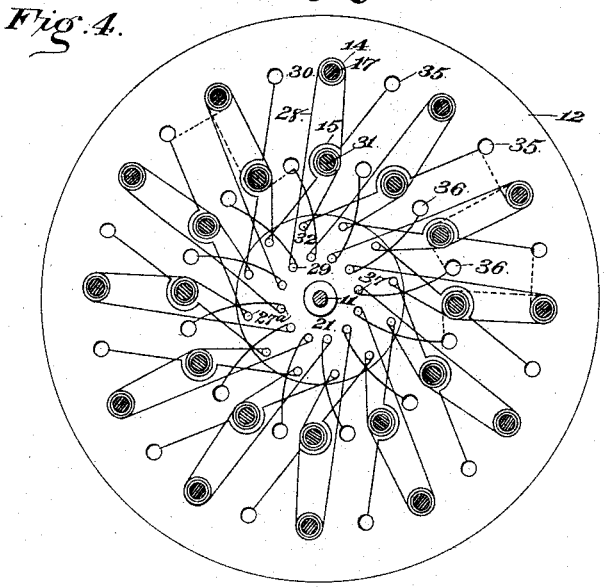
Figure 5:
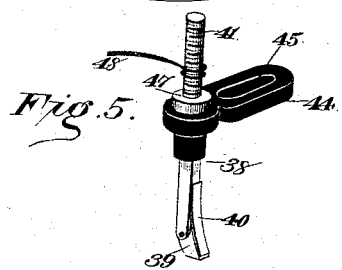

In the accompanying drawings;—Figure 1 is a perspective view of an electric motor constructed in accordance with my invention. Fig. 2 is a vertical central sectional view of the same. Fig. 3 is a side view with one of the stationary armatures removed. Fig. 4 is a section taken through the magnets on one side of the revolving armature plate and illustrating the method of connecting the magnets with each other and the commutator. Fig. 5 is a detail in perspective of one of the commutator brushes.

Referring to the accompanying drawings; 1—1 represent the side frame plates in which the various parts are inclosed and each of said plates is provided with squared recesses 2 formed at spaced intervals along the periphery thereof and which is designed to receive the ends of the connecting plates or bars 3 each of which is provided at one end with circular perforations 4 engaged by the securing screws 5 passing therethrough and into the edges of the said armature plates, while the opposite ends of said armature plates are provided with the slotted perforations 6 also engaged by securing screws 5 passing therethrough and into the edge of the opposite armature plate, but which allow for a lateral adjustment of the plates to and from each other as may be desired and as will be described. Upon each of said frame plates are secured the opposite pairs of horse shoe or field magnets 7, the cores 8 of which are secured within the plates and are connected at their junction with said plates by the connecting soft metal plates 9, while the top of the cores terminate in the enlarged ends or plates 10 inclosing the coils of wire wound therearound. Each pair of said field or horse shoe magnets has the electric wires wound around each magnet in a reverse direction in order that the ends of the magnets will be of different polarities, and each opposite pair of said magnets upon the same plate is also wound in the same manner but with the same electric wire as the opposite magnet is wound with, thus providing horse shoe or field magnets oppositely arranged to each other and having the poles thereof alternately disposed.

Journaled within the side plates is the revolving shaft 11 rigidly secured to the center of which and between the opposite pairs of magnets is the revolving armature plate 12. The said armature plate is provided with concentric circular rows of perforations 13 which are designed to accommodate the outer and inner rows of magnets 14 and 15 respectively, which are located on both sides of said plate. The outer rows of magnets are of a larger size than the smaller inner rows, in order to secure room or space for a greater number of magnets and for placing the same closer together, and the number of magnets in the circular rows are proportionate to the number of stationary magnets, which being illustrated and described as being eight in number will necessarily be twenty-four to effectively cause a steady operation of the motor. The cores 17, of each of the circular rows of opposite magnets are secured together preferably in the manner illustrated, in which the inner ends of the cores upon one side of the plate 12 are provided with threaded recesses 18, while the cores of the magnets arranged upon the opposite face of said plate are provided with the screw threaded ends 19 which project through the perforations 13 in said plate and engage the threaded recesses of the cores of the opposite magnet, the head of each core terminating in an enlarged face or plate 20 similar to the face or plate 10 of the stationary magnets upon the stationary plates. Within the inner circle 15 of the revolving magnets and on opposite sides of the revolving diaphragm or armature plate are located the rubber disks 21 between which are interposed the rubber packings 22 seated within the segmental and circularly arranged perforations 23 in the center of said armature plate and which provide a thorough insulation for the commutators secured upon one of said disks and the conducting wires or rivets therebetween. Upon one of said disks as stated are placed the commutators 24 and 25 concentrically arranged with relation to each other and the shaft 11. Said commutators are securely held upon one of said disks, and the disks themselves are held together by means of the metallic securing and conducting pins or rivets 26. Each of said commutators is provided with the regularly spaced segmental contact faces 27 which by means of the connections with the insulating disks are connected with the opposite wires or pins 27ª which are connected with the ends of the rivets upon the opposite side of the armature plate and thus also provide upon said opposite side an outer and inner row of connecting pins to which are connected the electric wires 28 which are arranged around the cores of the magnets in such a way as to make each adjacent pair of outer and inner magnets of different polarities from those immediately adjacent thereto, and also to make the corresponding pair of outer and inner magnets on one side of the armature plate of different polarity from those upon the opposite side.

Fig. 4 illustrates the method in which the electric wires are wound. Starting from an inner commutator pin 29 upon one side of the armature plate, the wire is passed to one of the outside magnets designated as 30 and is coiled therearound, from which the wire is passed around the core of the inner magnet 31 adjacent to said outer magnet and coiled in the same direction as on the magnet 30 and then is passed to an outer commutator pin 32. From the outer commutator pin 32 the wire skips the next adjacent pair of outer and inner magnets and is conducted through one of the outer series of perforations 35 in said armature plate to the other side of said plate and is coiled around the cores of the pair of magnets upon the opposite side of the armature plate next to the pair of magnets between the same and the magnets upon which the wire was first wound, and having been wound around said magnets upon the opposite side of the armature plate, the wire is conducted back through one of a series of inner perforations 36 to an inner commutator pin 37, from which point the wire is wound around alternate pairs of magnets upon alternate sides of the armature plate until the starting point is reached thus completing one of the independent magnet circuits connected with the commutators. According to the number of pairs of outer and inner magnets upon each side of the armature plate, each alternate pair upon opposite sides of said plate is connected together in circuit with each other in the same line and the commutator pins in a similar manner to that just described, and as can be readily seen like and unlike poles of the magnets will be alternately arranged around each side of the dividing plate and alternately arranged with relation to each other upon opposite sides. It will be seen that several independent lines of magnet circuits are thus provided, which are successively, but entirely independently, brought into play as the armature is revolved and the current changed from one to the other of the lines.

Commutator brushes 38 are adapted to alternately make and break the circuit with the contact faces of the concentric commutator. The said commutator brushes are provided upon their inner ends with the pivoted contact feet 39 which are normally pressed inward by the leaf spring 40 which always keeps the same in contact with the faces of the commutators, and are provided on their outer ends with the screw threaded portions 41 that pass through the segmental slots 43 formed in one of the stationary plates and are secured in the adjusting plates 44 which are provided with the longitudinal slots 45 that are adapted to work over the set screws 46 which allow the said brushes to be set at any point of travel against the faces of the commutators, and the length of which may be regulated by means of the threaded collars or nuts 47 working over the screw threaded ends of the brushes upon the outside of said adjusting plates. The current is led from the wire 48 through one of the fields to one of the commutator brushes from which the same passes successively through the several magnet lines described. The current passes successively from the several magnet lines of the revolving armature and back to the other brush from which the current is conducted through the other field upon the other side of the motor and out through the wire 49.

From the foregoing description it can be readily seen that while one of the poles of a field magnet is repelling the like poles and attracting the unlike poles of the nearest pairs of magnets upon the revolving armature, the other poles of said stationary magnets are exerting like repulsions and attractions and are working simultaneously with each other to rapidly revolve the interposed revolving armature. The construction and operation of my improved electric motor are otherwise thought to be apparent without further description.

Although it is optional, as stated in the specification, the number of different lines or independent circuits in the revolving armature, nevertheless it is preferable to construct said armature so that the same shall have four different lines or circuits as illustrated in the accompanying drawings and described hereinbefore, so as to be proportionate to the number of field magnets most advantageously employed. It may be also noted at this point, that it can be readily seen that all the magnets or cores comprising the revolving armature are not polarized simultaneously, on account of the independence of the different lines but that every other magnet thereof is alone polarized, but all of the armature magnets are at the same time attracted and repelled by the field magnets. While, the like poles of the field magnets repel like poles of the armature and attract unlike poles thereof, they also attract the unpolarized magnets of said armature through which no current is passing and which alternates, as the armature revolves between the north and south pole magnets thereof, thus while one pole of the field magnets is repelling the like poles of the armature, and attracting the neutral magnet of the same, it also attracts the next succeeding unlike pole of said armature, the same attractions and repulsions being exerted by all the field magnets.

Having thus described my invention, what I claim and desire to secure by Letters Patent is:—

1. In an electric motor, stationary frame plates, opposite pairs of field magnets upon each of said plates and having different polarities with relation to each other, a revolving armature interposed between said field magnets and comprising a circular plate, and concentric rows of magnets arranged upon both sides of said plate and separated in separate and different circuits, said magnets also being arranged in pairs comprising an outer and an inner magnet of the same polarity and in the same circuit, a double commutator secured upon one side of said circular plate and at the center thereof and connected with the several circuits, and adjustable commutator brushes mounted in one of said frame plates and contacting with different faces of the commutator, substantially as described.

2. In an electric motor, the combination with the opposite stationary field magnets, of the revolving armature interposed between the same and comprising a circular plate, concentric rows of magnets arranged upon both sides of said plate and in different circuits, a double commutator secured upon one side of said plate within the inner rows of magnets, commutator pins or wires projecting from the opposite side of said plate and connected with the circuit wires of said magnets so as to separate the same into pairs of outer and inner magnets alternately connected with each other upon opposite sides of said plate, and adjustable commutator brushes, substantially as set forth.

3. In an electric motor, the combination with the opposite stationary field magnets of the revolving armature comprising a circular plate, concentric rows of magnets of different sizes secured upon opposite sides of said plate circular commutators having segmental contact faces secured upon one side of said plate concentric with each other, concentric rows of commutator pins projecting from the opposite side of said plate and alternately connected with the independent circuit wires of said magnets so as to separate the same into pairs of outer and inner magnets of the same polarity alternately connected with each other on opposite sides of said plate, and adjustable commutator brushes, substantially as set forth.

4. In an electric motor, stationary parallel frame plates adjustably connected together, opposite pairs of field magnets secured to the inner faces of said plates, a revolving armature interposed between said magnets, a double concentric commutator centrally secured to the said armature and in circuit with the magnets thereof, and the commutator brushes adjustably secured within one of said frame plates and provided with spring-actuated contact feet adapted to normally bear upon said commutator contact faces, substantially as set forth.

5. In an electric motor, the combination with the laterally adjustable stationary field magnets, and the central revolving armature and commutator, of the commutator brush having an outer contact foot pivotally secured to one end a leaf spring secured to the body of the brush and normally pressing said foot against the commutator, and means for adjustably securing the same within one of said frame plates, substantially as set forth.

6. In an electric motor, the stationary frame plates having opposite segmental slots, a revolving armature, concentrically arranged commutators having segmental contact faces centrally secured to said armature, commutator brushes having spring-actuated contact feet and screw threaded ends projecting through said segmental slots, adjusting nuts mounted upon the outer ends of said brushes, and adjusting plates carrying said outer ends of the brushes and provided with longitudinal adjustment slots working over said screw for adjusting said brushes in said segmental slots, substantially as set forth.

In testimony that I claim the foregoing as my own I have hereto affixed my signature in the presence of two witnesses.

JULIUS W. HANSEN.

Witnesses:
NICOLAUS A. FLEISCHER,
FRANK FORD.